(12) United States Patent
Inui et al.

(10) Patent No.: US 10,782,604 B2
(45) Date of Patent: Sep. 22, 2020

(54) PROJECTION-TYPE VIDEO DISPLAY APPARATUS

(71) Applicant: MAXELL, LTD., Kyoto (JP)

(72) Inventors: Shinro Inui, Ibaraki (JP); Hidemi Yamada, Ibaraki (JP); Eiki Ishijima, Ibaraki (JP)

(73) Assignee: MAXELL, LTD., Kyoto (JP)

( * ) Notice: Subject to any disclaimer, the term of this patent is extended or adjusted under 35 U.S.C. 154(b) by 63 days.

(21) Appl. No.: 16/310,243

(22) PCT Filed: Jun. 29, 2016

(86) PCT No.: PCT/JP2016/069340

§ 371 (c)(1),
(2) Date: Dec. 14, 2018

(87) PCT Pub. No.: WO2018/003041

PCT Pub. Date: Jan. 4, 2018

(65) Prior Publication Data

US 2019/0258150 A1    Aug. 22, 2019

(51) Int. Cl.
*G03B 21/20* (2006.01)
*G03B 21/14* (2006.01)
*G03B 21/00* (2006.01)

(52) U.S. Cl.
CPC ......... *G03B 21/2066* (2013.01); *G03B 21/00* (2013.01); *G03B 21/14* (2013.01); *G03B 21/145* (2013.01); *G03B 21/20* (2013.01)

(58) Field of Classification Search
CPC .... G03B 21/2066; G03B 21/20; G03B 21/14; G03B 21/00; G03B 21/145; G03B 21/142;

(Continued)

(56) References Cited

U.S. PATENT DOCUMENTS

2005/0073659 A1    4/2005    Sannohe et al.
2009/0180081 A1*   7/2009    Yanagisawa ........... G03B 33/12
                                                          353/37
2010/0231871 A1*   9/2010    Kitahara .................. G03B 9/14
                                                          353/93

FOREIGN PATENT DOCUMENTS

JP    06-018769 A    1/1994
JP    2004-094262 A  3/2004

(Continued)

OTHER PUBLICATIONS

International Search Report dated Aug. 23, 2016 for the PCT International Application No. PCT/JP2016/069340.

*Primary Examiner* — Michelle M Iacoletti
*Assistant Examiner* — Danell L Owens
(74) *Attorney, Agent, or Firm* — Volpe and Koenig, P.C.

(57) ABSTRACT

A projection-type video display apparatus includes: light sources, an illumination optical system, a display element, and a projection optical system. The illumination optical system includes: a mirror that reflects the illumination light toward the display element; a lens that is placed between the mirror and the display element on an optical path of the illumination light; a mirror angle adjustment mechanism that adjusts an angle of the mirror; a light-shielding plate that blocks unwanted light which is a portion of the illumination light reflected off the mirror toward the display element via the lens; and a light-shielding plate movable mechanism that is able to move the light-shielding plate between a first position to block the unwanted light and a second position to permit the unwanted light to illuminate the display element.

5 Claims, 12 Drawing Sheets

(58) Field of Classification Search
CPC .. G03B 21/2013; G03B 21/2053; G03B 9/14; G03B 21/2026
See application file for complete search history.

(56) References Cited

FOREIGN PATENT DOCUMENTS

| | | |
|---|---|---|
| JP | 2004-233688 A | 8/2004 |
| JP | 2004-258439 A | 9/2004 |
| JP | 2005-309337 A | 11/2005 |
| JP | 2006-047684 A | 2/2006 |
| JP | 2006-308992 A | 11/2006 |
| JP | 2011-164479 A | 8/2011 |
| JP | 2013-134405 A | 7/2013 |

* cited by examiner

FIG. 10A
FIG. 10B
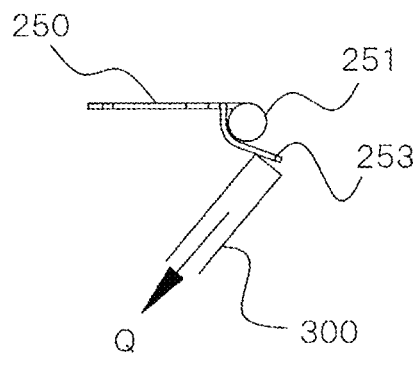
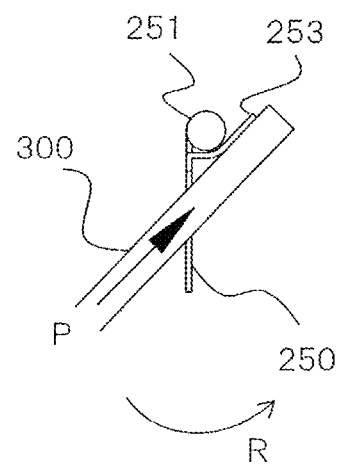

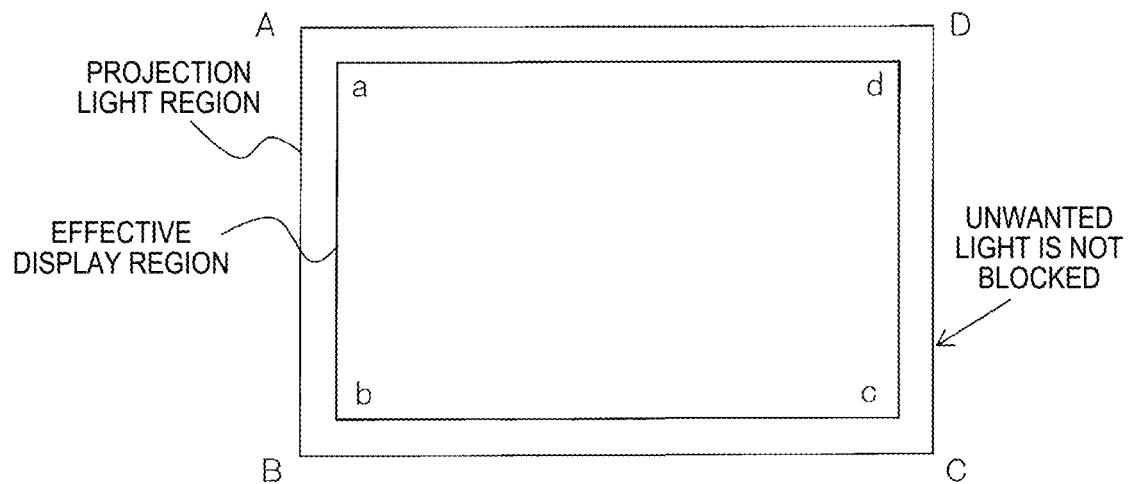
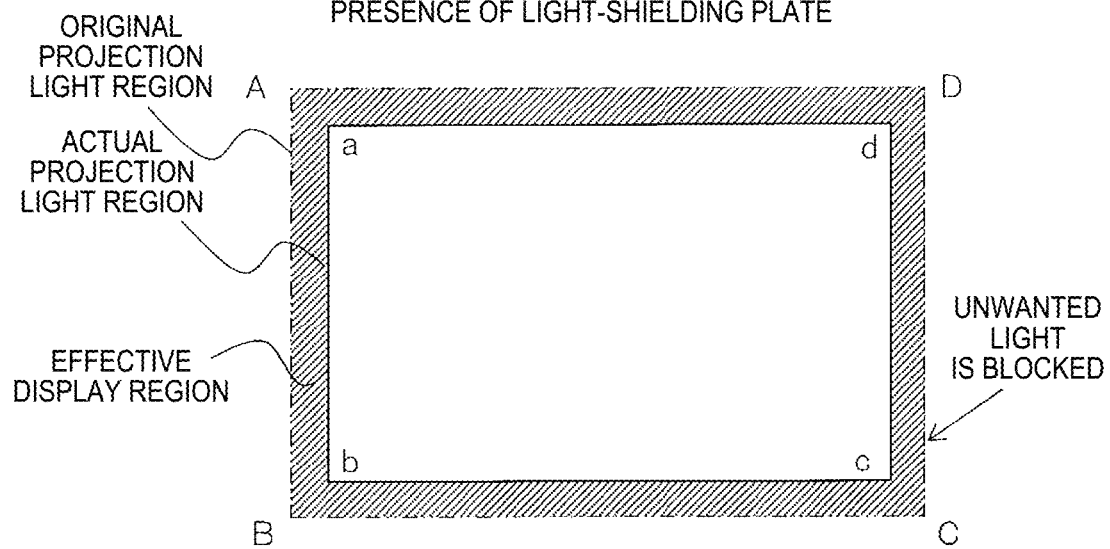

PROJECTION-TYPE VIDEO DISPLAY APPARATUS

TECHNICAL FIELD

The invention relates to a projection-type video display apparatus.

BACKGROUND ART

In general, a projection-type video display apparatus includes a light source, an illumination optical system that collects light emitted from the light source to produce illumination light, a display element that produces an image to be projected, and a projection optical system that projects the image onto a screen or the like. Illumination light produced at the illumination optical system is reflected by a mirror to illuminate the display element.

A portion of the illumination light illuminating the display element enters a projection lens of the projection optical system as light no longer required for the image projection (hereinafter referred to as "unwanted light"). The unwanted light is seen on a screen, or the like, which in turn adversely affects the quality of the projected image to become a factor in a decrease in contrast. For this reason, inhibiting the entry of unwanted light into the projection lens is important for the prevention of the quality of the projected image from being reduced.

A conventional technology to inhibit the entry of unwanted light into the projection lens is well known from, for example, Patent Literature 1. Patent Literature 1 describes "a shield formed in a semicircular shape, a circular shape, an oval shape or the like is placed in an aperture of a projection optical system in order to block unwanted light."

CITATION LIST

Patent Literature

Patent Literature 1: JP-A No. 2006-308992

SUMMARY OF INVENTION

Technical Problem

In this type of projection-type video display apparatus, there is a need to adjust the angle of a specific mirror by which the illumination light from the illumination optical system is reflected toward the display element (hereinafter referred to as a "light-beam angle adjustment mirror"), in order for the video display range of the display element (hereinafter referred to as an "effective display region") to fall within the range of the illumination light from the illumination optical system (hereinafter referred to as a "projection light region"), and also for a region occurring between the effective display region and the projection light region to become a minimally required margin which is approximately equal in the vertical and lateral directions.

The "minimally required margin" used herein refers to a minimum margin required for preventing defects, such as a change in color, a missing part and/or the like, from occurring in an image projected onto a screen or the like even if a positional misalignment of the illumination light is caused by temperature variations that occur in the environment in which the projection-type video display apparatus is used, temperature variations that occur within the projection-type video display apparatus, external impacts such as vibrations, a drop and/or the like, and/or the like.

Reference is made to FIG. 12A,B to explain a change in relative positions of the effective display region and the projection light region before and after the angle adjustment to the light-beam angle adjustment mirror. As illustrated in FIG. 12A, if the angle of the light-beam angle adjustment mirror is not correct, then positional misalignment of the projection light region with respect to the effective display region is produced. To address this, as illustrated in FIG. 12B, a need arises to turn the light-beam angle adjustment mirror about an X axis and/or a Y axis for angle adjustment in order to adjust the relative positions of the effective display region and the projection light region so that a region occurring between the effective display region and the projection light region becomes a minimally required margin which is approximately equal in the vertical and lateral directions.

Where the above-described angle adjustment to the light-beam angle adjustment mirror is performed on the projection-type video display apparatus described in Patent Literature 1, there is a problem of difficulty in making angle adjustment to the light-beam angle adjustment mirror because the unwanted light is blocked by a light-shielding plate. The problem is explained with reference to FIG. 13A,B. As illustrated in FIG. 13A, in the condition of absence of a light-shielding plate, the entire original projection light region ABCD is projected onto the screen. Because of this, it is easy to make the angle adjustment to the light-beam angle adjustment mirror in order for the projection light region ABCD to overlap the effective display region abcd in an optimum position.

In the condition of presence of the light-shielding plate, however, as illustrated in FIG. 13B, because the unwanted light is blocked by the light-shielding plate, the actual projection light region projected onto the screen falls into the same range (abcd) as the effective display region abcd. Specifically, a region (the diagonally shaded region in FIG. 13B) occurring between the effective display region abcd and the original projection light region ABCD is not projected onto the screen. Because of this, in the condition of presence of the light-shielding plate as illustrated in FIG. 13B, it is not easy to make the angle adjustment to the light-beam angle adjustment mirror in order for the effective display region abcd to fall within the range corresponding to the projection light region ABCD and also for a region occurring between the effective display region abcd and the projection light region ABCD to become the minimally required margin which is approximately equal in the vertical and lateral directions.

In this manner, the projection-type video display apparatus described in Patent Literature 1 is capable of preventing a reduction in projected image quality by use of the light-shielding plate to inhibit the entry of unwanted light into the projection lens, but in the meantime, there is a problem of difficulty in making angle adjustment to the light-beam angle adjustment mirror.

The present invention has been made in view of the above-described circumstances, and it is an object of the invention to provide a projection-type video display apparatus which is capable of preventing a reduction in quality of projected images and facilitating the angle adjustment to a light-beam angle adjustment mirror.

Solution to Problem

To attain this object, a representative aspect of the present invention provides a projection-type video display apparatus including: light sources; an illumination optical system that collects light emitted from the light sources to produce illumination light; a display element that produces video to be projected; and a projection optical system where the illumination light produced in the illumination optical system enters to project the video produced on the display element. The illumination optical system includes: a mirror that reflects the illumination light toward the display element; a lens that is placed between the mirror and the display element on an optical path of the illumination light; a mirror angle adjustment mechanism that adjusts an angle of the mirror; a light-shielding plate that blocks unwanted light which is a portion of the illumination light reflected off the mirror toward the display element via the lens; and a light-shielding plate movable mechanism that is able to move the light-shielding plate between a first position to block the unwanted light and a second position to permit the unwanted light to illuminate the display element.

Advantageous Effects of Invention

According to the present invention, it is possible to provide the projection-type video display apparatus enabling the prevention of a reduction in quality of projected images and the facilitation of the angle adjustment to the light-beam angle adjustment mirror. It is noted that the above and other problems, configurations and advantages will be more apparent from the following description of embodiments.

BRIEF DESCRIPTION OF DRAWINGS

FIG. 6A, B are schematic diagrams for explaining the mechanism of angle adjustment to the light-beam angle adjustment mirror, in which FIG. 6A illustrates the parallel state of the light-beam angle adjustment mirror and FIG. 6B illustrates the tilted state of the light-beam angle adjustment mirror.

FIG. 9A, B are perspective views of a lens holder holding the relay lens, in which FIG. 9A is the view illustrating the state where the light-shielding plate shields a portion of the relay lens.

FIG. 10A, B are diagrams illustrating the inserted position of a jig and the rotation position of the light-shielding plate, in which FIG. 10A illustrates the state where the jig slightly presses an abutting piece, and FIG. 10B illustrates the state where, after rotating the abutting piece, the jig is inserted beyond the position of the abutting piece located before the insertion of the jig.

FIG. 11A, B are diagrams illustrating a modification of a movable mechanism of the light-shielding plate, in which FIG. 11A illustrates the state where the light-shielding plate is in a position to shield a portion of the relay lens to block the unwanted light (first position)

FIG. 13A, B are diagrams for explaining the difference in angle adjustment to the light-beam angle adjustment mirror between when the light-shielding plate is absent (FIG. 13A) and when the light-shielding plate is present (FIG. 13B).

DESCRIPTION OF EMBODIMENTS

Embodiments according to the present invention will now be described in detail with reference to the accompanying drawings. It should be noted that like reference signs refer to like components/sections as a rule throughout the figures used for description of the embodiments, and a repetitive description is omitted. However, a site/area having been described using reference signs in a certain figure may be sometimes mentioned using the same reference signs in a description of another figure in which the site/area is not shown again.

Apparatus Configuration (Overview)

Figure 1:
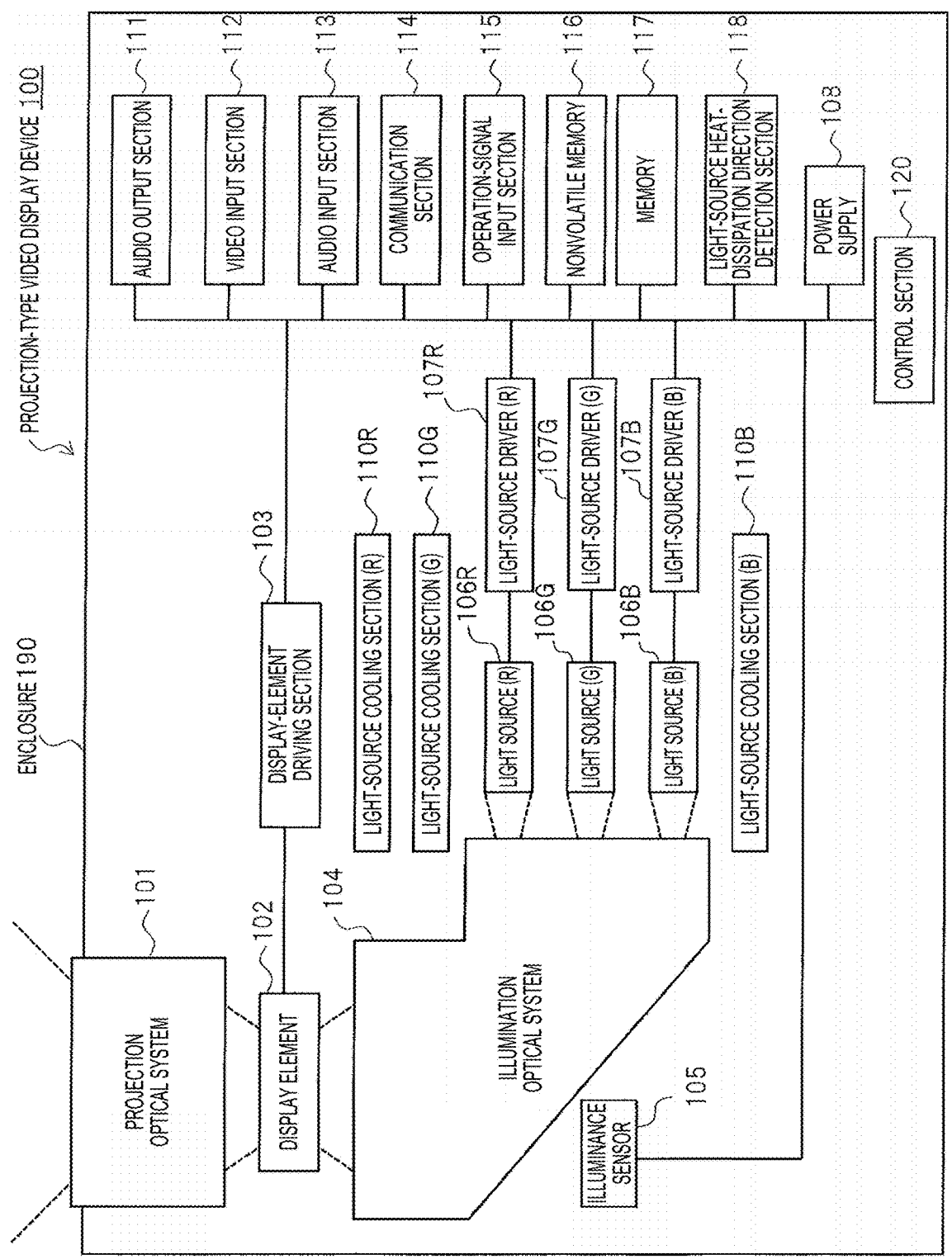
FIG. 1 is a diagram illustrating the overview of an example configuration of a projection-type video display apparatus according to an embodiment of the present invention.
Figure 2:
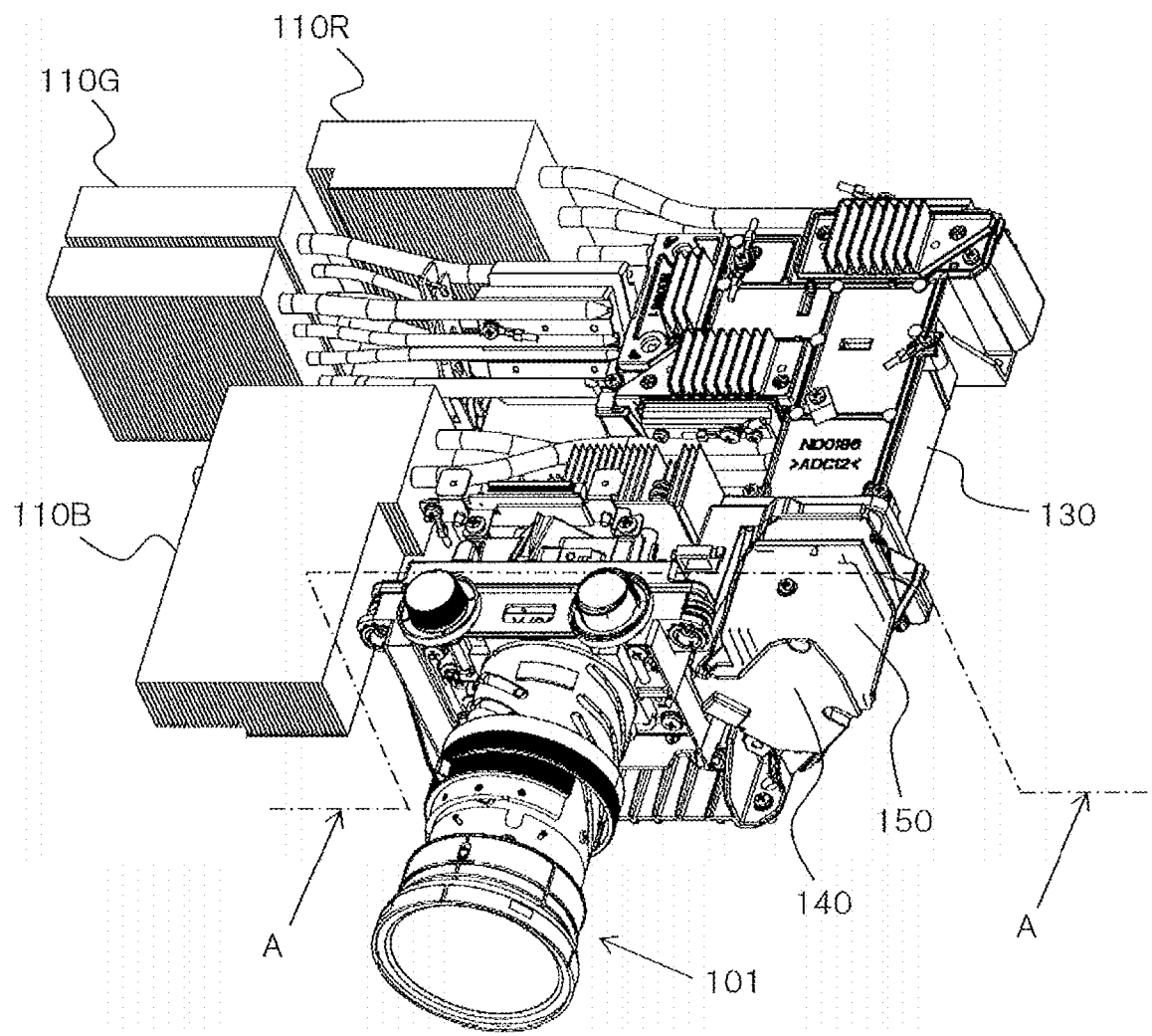
FIG. 2 is a perspective view illustrating the external appearance of an optical engine of the projection-type video display apparatus according to the embodiment.

FIG. 1 is a diagram illustrating the overview of an example configuration of a projection-type video display apparatus according to an embodiment of the present invention. FIG. 2 is a perspective view illustrating the external appearance of an optical engine of the projection-type video display apparatus according to the embodiment.

In FIG. 1, the projection-type video display apparatus 100 is, for example, a liquid crystal projector that receives power supply from a not-shown external power supply and projects video onto a not-shown screen to display it in an enlarged view, or the like.

As illustrated in FIG. 1, the projection-type video display apparatus 100 has various sections, for example, within an enclosure 190, such as a projection optical system 101, display element 102, display element driving section 103, illumination optical system 104, illuminance sensor 105, light source 106R, light source 106G, light source 106B, light-source driver 107R, light-source driver 107G, light-source driver 107B, power supply 108, light source cooling section 110R, light source cooling section 110G, light source cooling section 110B, audio output section 111, video input section 112, audio input section 113, communication section 114, operation-signal input section 115, nonvolatile memory 116, memory 117, control section 120, and the like.

The light-source driver 107R drives the light source 106R in accordance with control from the control section 120. The light-source driver 107G drives the light source 106G in accordance with control from the control section 120. The light-source driver 107B drives the light source 106B in accordance with control from the control section 120.

The light source 106R emits red (R) light of the light to project an image on the basis of control from the light-source driver 107R. The light source 106G emits green (G) light of the light to project an image on the basis of control from the light-source driver 107G. The light source 106B emits blue (B) light of the light to project an image on the basis of control from the light-source driver 107B.

The light source 106R, the light source 106G and the light source 106B each include, for example, a LED (Light Emitting Diode) light source, a laser light source or the like, and are housed in a light source housing section 130 as shown in FIG. 2.

The light source cooling section 110R, 110G, 110B includes, for example, a heat pipe and/or the like. The heat pipe is desirably formed of materials with excellent thermal conductivity. Examples of materials suitable for the heat pipe include metal such as copper and the like, and the like.

The illumination optical system 104 is an optical system having optical elements such as more than one lens that focus the light emitted from the light source 106R, the light source 106G and the light source 106B to generate white light, and the like. Various optical components forming the illumination optical system 104 are housed in an optical component housing section 140 shown in FIG. 2. Incidentally, the internal configuration of the optical component housing section 140 will be described in detail later.

The illuminance sensor 105 senses the amount of light for use in image projection in the illumination optical system 104, and transmits data on the sensed amount of light to the control section 120.

The display element 102 includes a transmissive or reflective liquid crystal panel, a DMD (Digital Micromirror Device (registered trademark)) panel, or the like. The display element 102 forms an image to be projected on the basis of the video data transmitted from the control section 120. The display element 102 passes through or reflects the light which has been focused by the illumination optical system 104, to project the image formed on the element. It is noted that a single display element 102 or multiple display elements 102 may be provided.

The projection optical system 101 is an optical system having optical elements such as more than one lens or mirror that enlarges and projects an optical image on the display element 102, as an image onto a not-shown screen or the like.

The audio output section 111 includes a speaker, an external output terminal, and the like. The audio output section 111 outputs audio data associated with display video, and outputs a message alert sounds, beep sounds, audio data related to operation of the projection-type video display apparatus 100, an error and/or the like, and/or the like.

The video input section 112 is an external interface that receives as input the video data for projection from a not-shown information processing terminal, such as PC (Personal Computer), a tablet terminal, a smartphone or the like, connected thereto via a not-shown video input terminal, and then transmits the input video data to the control section 120. It is noted that the video input terminal may have a plurality of types such as, e.g., HDMI (High-Definition Multimedia Interface (registered trademark)), VGA (Video Graphics Array), DVI (Digital Visual Interface) and/or the like.

The audio input section 113 accepts as input the audio data associated with video data for projection, and/or the like, from an information processing terminal which is connected thereto via an external interface. The input video data and the input audio data may be buffered in the memory 117 which will be described later.

The communication section 114 has the function for communicating with, for example, a not-shown information processing terminal such as PC, a table terminal, a smartphone or the like, for input/output of various control signals and the like. The operation signal input section 115 is an input interface for operating the projection-type video display apparatus 100. The operation signal input section 115 includes, for example, operation buttons installed on the main body of the projection-type video display apparatus 100, and a light receiving section in a remote controller, and accepts as input the operation data from the user.

The operation signal input section 115 is an external interface that transmits instruction input for the projection-type video display apparatus 100 to the control section 120 after receiving the instruction input from the user by operation of the not-shown button(s) and/or the like via a not-shown panel and/or the like mounted on the enclosure 190 which is an outer sheath of the projection-type video display apparatus 100. Also, the operation signal input section 115 may include, for example, a receiver section and may be configured such that the receiver section receives the operation performed through a not-shown remote controller or the like.

The nonvolatile memory 116 includes nonvolatile memory such as flash memory and/or the like. The nonvolatile memory 116 stores: a control program for the projection-type video display apparatus 100; image data on display icons for various operations and the like; audio data, such as a message alert sounds, beep sounds and the like, related to operation, an error and/or the like; and/or the like. Further, the nonvolatile memory 116 may hold video data (including template images) for projecting an image by the projection-type video display apparatus 100 alone.

The memory 117 includes volatile memory such as DRAM (Dynamic Random Access Memory) and/or the like. The memory 117 expands and retains: the control program stored in the nonvolatile memory 116; various items of control data concerning the projection-type video display apparatus 100; and the like. The memory 117 also buffers the audio data, the data on video to be projected, and the like which have been received via the video input section 112 and the like.

A light source heat-dissipating direction detection section 118 detects a light source heat-dissipating direction of the light source cooling section 110R, 110G, 110B. The light source heat-dissipating direction detection section 118 transmits the detected light source heat dissipating direction data to the control section 120.

The power supply 108 receives power supply from a not-shown external power supply and supplies the power for operation to each of the sections forming the projection-type video display apparatus 100.

The control section 120 has the functions of controlling the operation of each section of the projection-type video display apparatus 100, such as of: forming an image to be projected in the display element 102; projecting an image under the control of the light-source drivers 107R, 107G, 107B; controlling the amount of light based on the light amount data received from the illuminance sensor 105; controlling based on the light source heat-dissipating direction data received from the light source heat-dissipating direction detection section 118; and the like, which are performed by, e.g., the operation of a microcomputer, the control program executed by CPU (Central Processing Unit) and/or the like.

Apparatus Configuration (Optical System)

Figure 3:
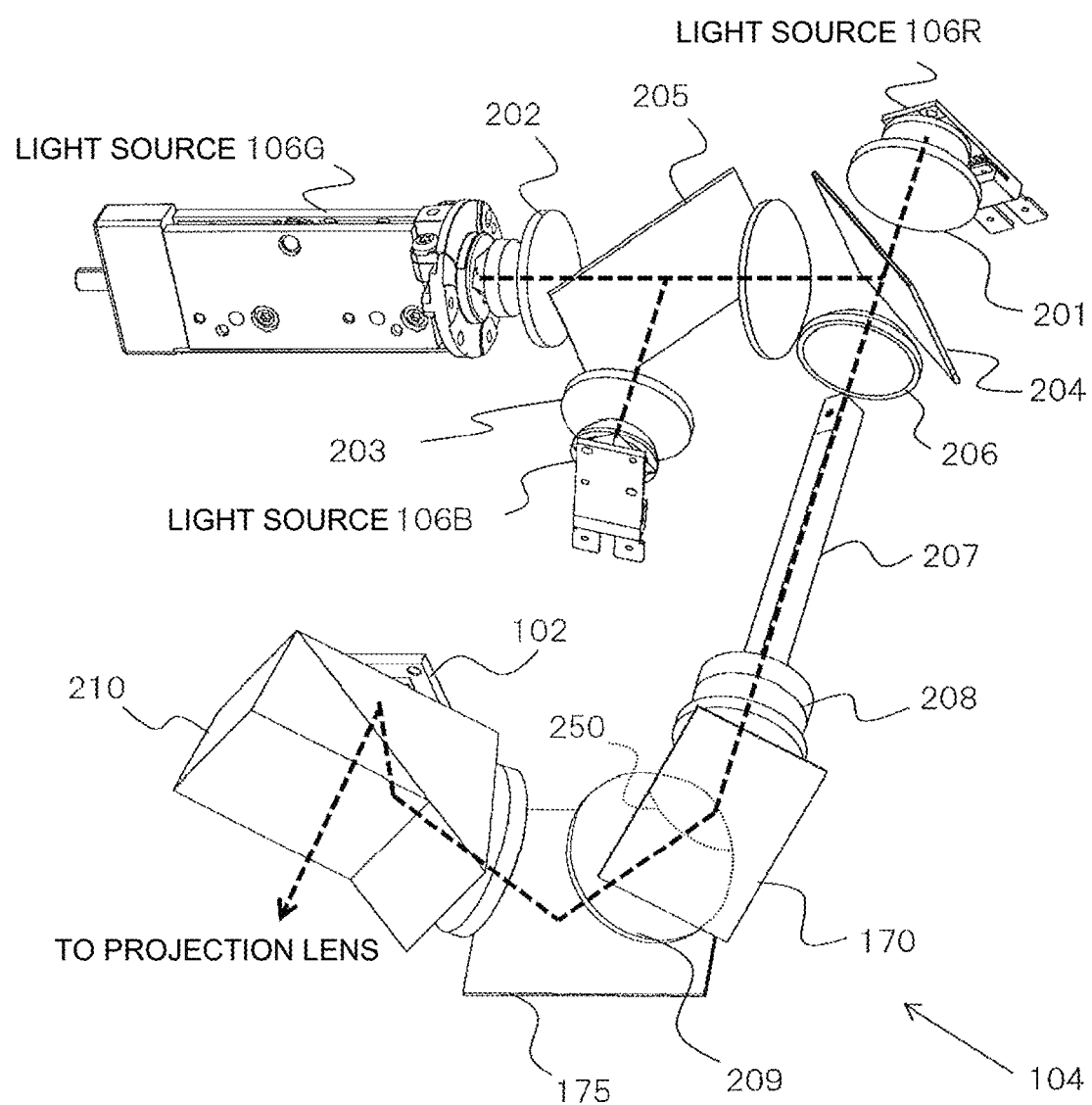
FIG. 3 is a perspective view illustrating the overview of an example configuration of an optical unit of the projection-type video display apparatus according to the embodiment.

FIG. 3 is a perspective view illustrating the overview of an example configuration of an optical unit of the projection-type video display apparatus according to the embodiment. As illustrated in FIG. 3, illumination lights diffuse after being emitted from the three color light sources, the light source 106R, the light source 106G and the light source 106B, which are located respectively in different positions, and the illumination lights are changed to illumination luminous fluxes by corresponding relay lenses 201, 202 and 203, which are then combined together by color combining mirrors (dichroic mirrors) 204 and 205 to form a white illumination luminous flux. In the example in FIG. 3, the illumination light from the light source 106G and the illumination light from the light source 106B are combined together by the color combining mirror 205, and then the resulting light is further combined with the illumination light from the light source 106R by the color combining mirror 204.

The white illumination luminous-flux thus combined together enters a rod integrator 207 via a relay lens 206 to make the illuminance distribution uniform, which is then extracted therefrom via a relay lens 208. After being reflected by a light-beam angle adjustment mirror 170, the illumination luminous flux enters a TIR (Total Internal Reflection) prism 210 via a relay lens 209 and a mirror 175. Then, the illumination luminous flux is totally reflected within the TIR prism to illuminate the display element 102 (the DMD panel in the embodiment) on which the image to be projected is produced. Then, the light reflected by the display element 102 passes through the TIR prism 210 to enter the projection optical system 101, so that the projection optical system 101 projects the video on a screen or the like which is not shown.

In the embodiment, the light-beam angle adjustment mirror 170 corresponds to the "mirror" in the present invention, and the relay lens 209 corresponds to the "lens" in the present invention.

A light-shielding plate 250 for shielding unwanted light is placed on the incoming side (on the light-beam angle adjustment mirror 170 side) of the relay lens 209. In the embodiment, a feature is that a movable light-shielding plate 250 is adopted. Incidentally, the structure of the light-shielding plate 250 will be described in detail later.

Mirror Angle Adjustment Mechanism

Figure 4:
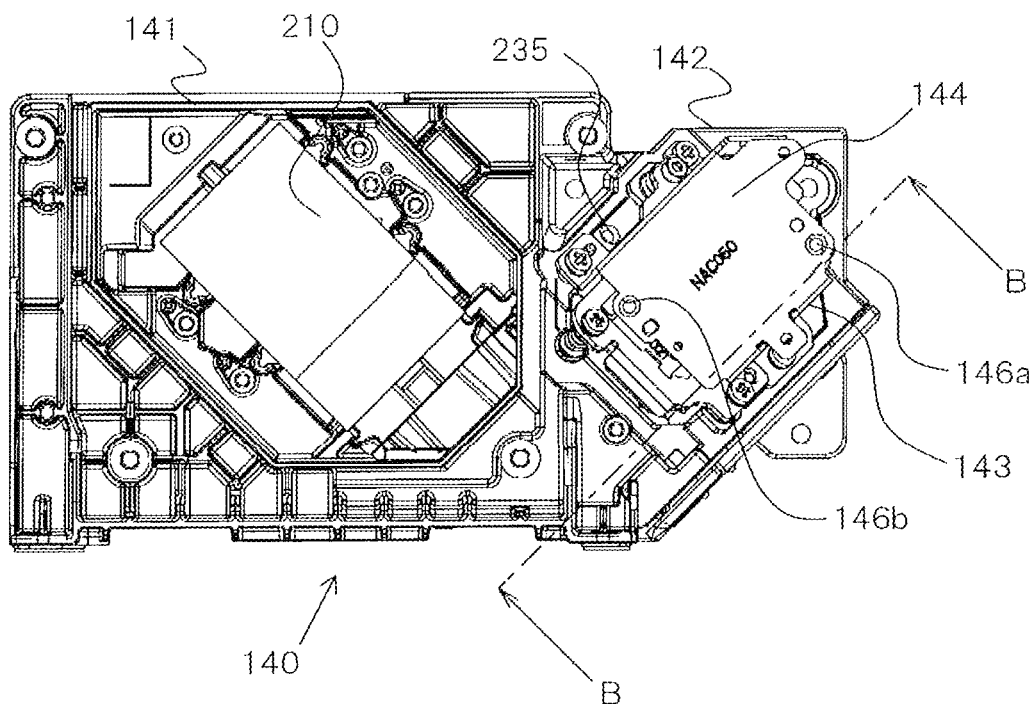
FIG. 4 is a sectional view of the optical component housing section shown in FIG. 2 being cut along a dash-dot line from above, as viewed from the direction A (from the front).
Figure 5:
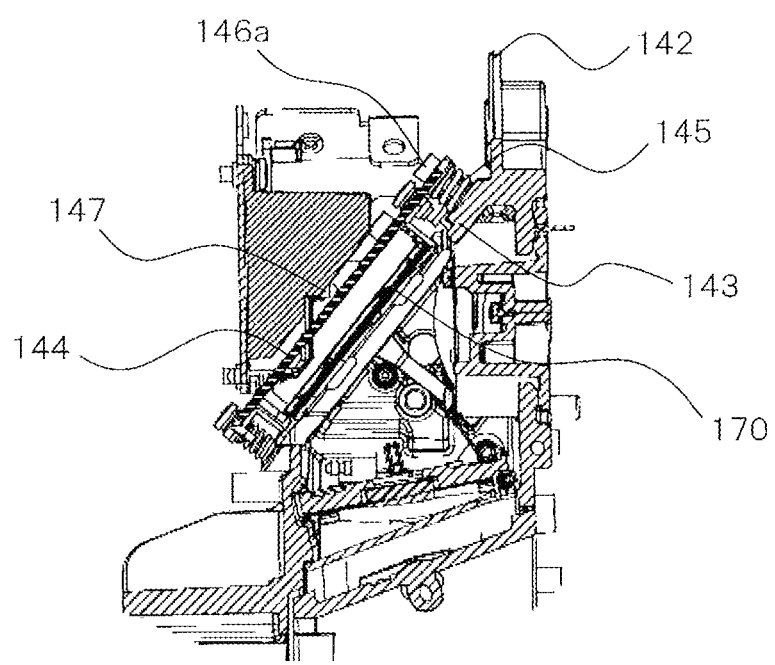
FIG. 5 is a sectional view taken along B-B shown in FIG. 4.

FIG. 4 is a sectional view of the optical component housing section 140 shown in FIG. 2 being cut along a dash-dot line from above, as viewed from the direction A (from the front). FIG. 5 is a sectional view taken along B-B shown in FIG. 4. As illustrated in FIG. 4 and FIG. 5, the optical component housing section 140 includes a first housing section 141 and a second housing section 142, in which the first housing section 141 is provided for mounting, mainly, the display element 102, the TIR prism 210 and the like, and the second housing section 142 is provided for mounting, mainly, the light-beam angle adjustment mirror 170, the angle adjustment mechanism of the light-beam angle adjustment mirror 170, the relay lens 209, the light-shielding plate 250, the movable mechanism of the light-shielding plate 250, and the like. It is noted that, in the embodiment, the second housing section 142 corresponds to the "housing section" in the present invention.

The first housing section 141 is a rectangular frame structure in which the TIR prism 210 and the like are able to be mounted as shown in FIG. 4. Although not shown, the display element 102 is placed behind the TIR prism 210.

Meanwhile, the second housing section 142 is a structure for holding the light-beam angle adjustment mirror 170 in a slanting position as shown in FIG. 5, and also for containing the relay lens 209, the light-shielding plate 250 and the like. Specifically, a mount 143 is formed in a rectangular frame form of a size approximately equal to that of the light-beam angle adjustment mirror 170, and the light-beam angle adjustment mirror 170 which is held by a mirror holding member 144 is held on the mount 143 while being biased by springs 145. That is, the light-beam angle adjustment mirror 170 is held at a predetermined distance from the mount 143 by a biasing force of the springs 145.

The springs 145 are placed pairwise on a diagonal line of the light-beam angle adjustment mirror 170, and adjustment screws 146*a*, 146*b* are inserted respectively into the pair of springs 145. Further, the center of the light-beam angle adjustment mirror 170 is supported by a supporting point 147. Because of this, the angle (inclination) of the light-beam angle adjustment mirror 170 can be freely adjusted around the supporting point 147 by tightening or loosening the adjustment screws 146*a*, 146*b*.

In the embodiment, the mount 143, mirror holding member 144, springs 145, adjustment screws 146*a*, 146*b* and supporting point 147 form the "mirror angle adjustment mechanism" in the present invention.

Figure 6A:
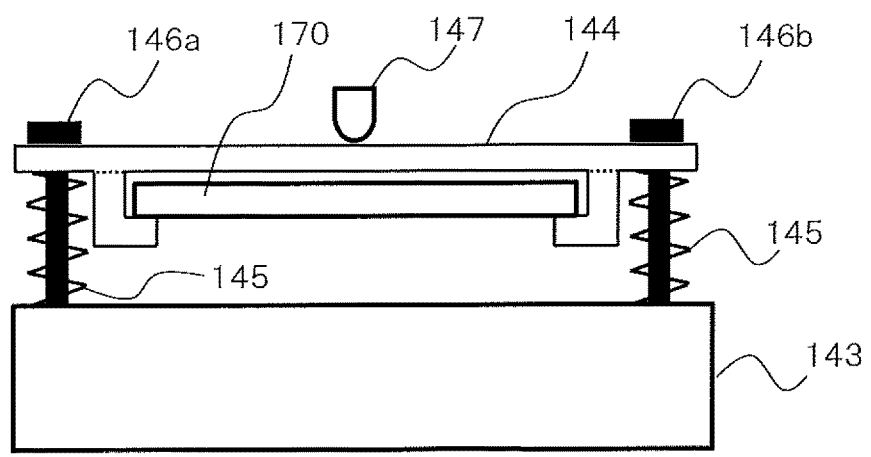
Figure 6B:
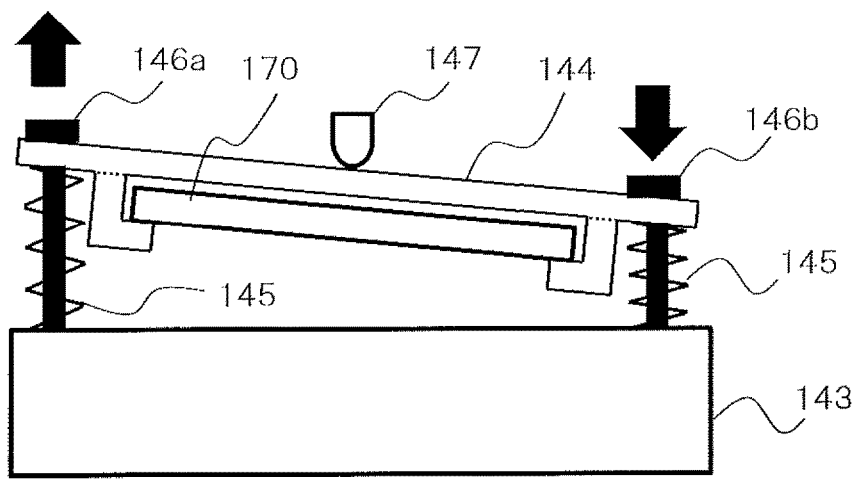

The angle adjustment to the light-beam angle adjustment mirror 170 will be described below using the figures. FIG. 6A,B are schematic diagrams for illustrating the mechanism of angle adjustment to the light-beam angle adjustment mirror 170. FIG. 6A illustrates the parallel state of the light-beam angle adjustment mirror 170 and FIG. 6B illustrates the tilted state of the light-beam angle adjustment mirror 170. As shown in FIG. 6A, where the heads of the two adjustment screws 146*a*, 146*b* are at the same level position as each other, the light-beam angle adjustment mirror 170 is kept parallel to the mount 143 by the biasing force of the springs 145.

Meanwhile, as shown in FIG. 6B, where one adjustment screw 146*b* is tightened and the other adjustment screw 146*a* is loosened, the light-beam angle adjustment mirror 170 is tilted around the supporting point 147, and held in a tilted state by the biasing force of the springs 145. In this manner, in the embodiment, the angle adjustment is made to the light-beam angle adjustment mirror 170 by rotating the adjustment screws 146*a*, 146*b*.

Light-Shielding Plate Movable Mechanism

Figure 7:
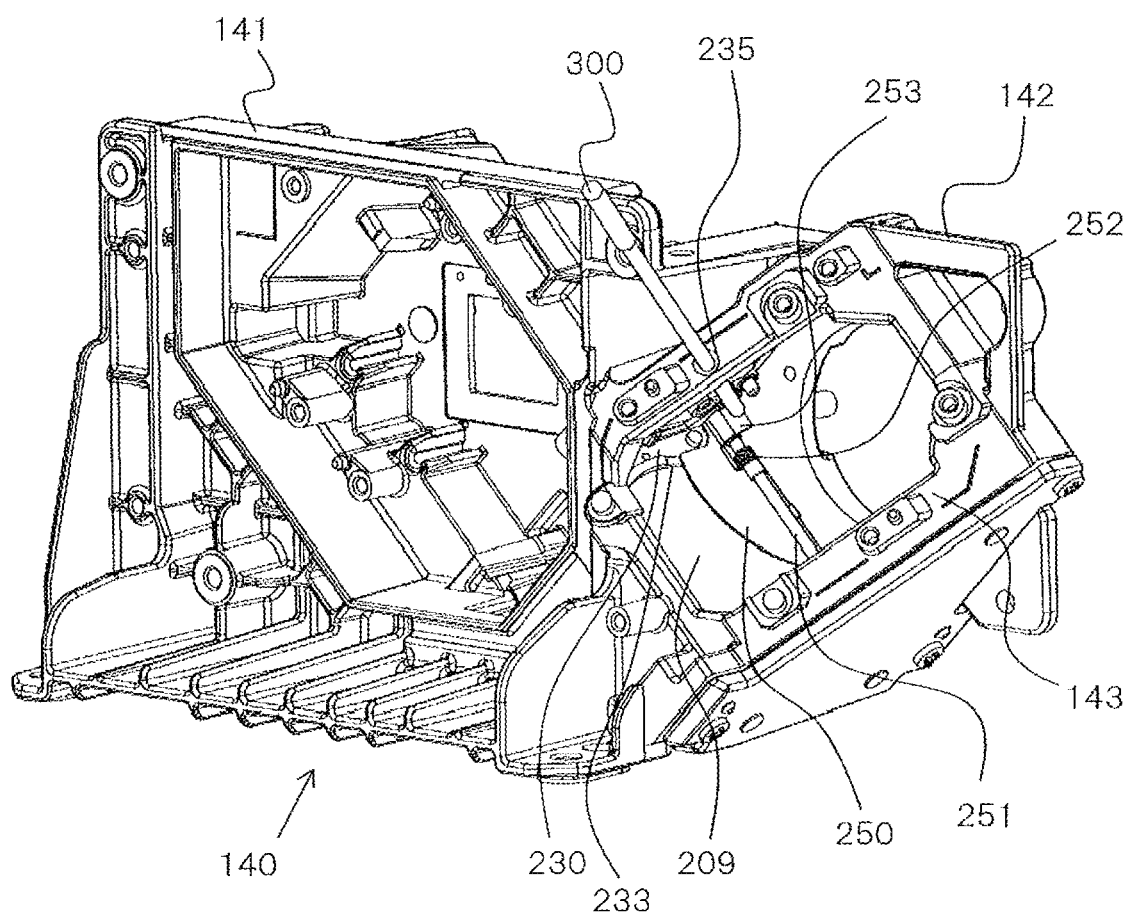
FIG. 7 is a perspective view illustrating the internal structure of the optical component housing section in the state where the light-beam angle adjustment mirror is removed and also in the state where a light-shielding plate is held at a position to shield a portion of a relay lens (first position).
Figure 8:
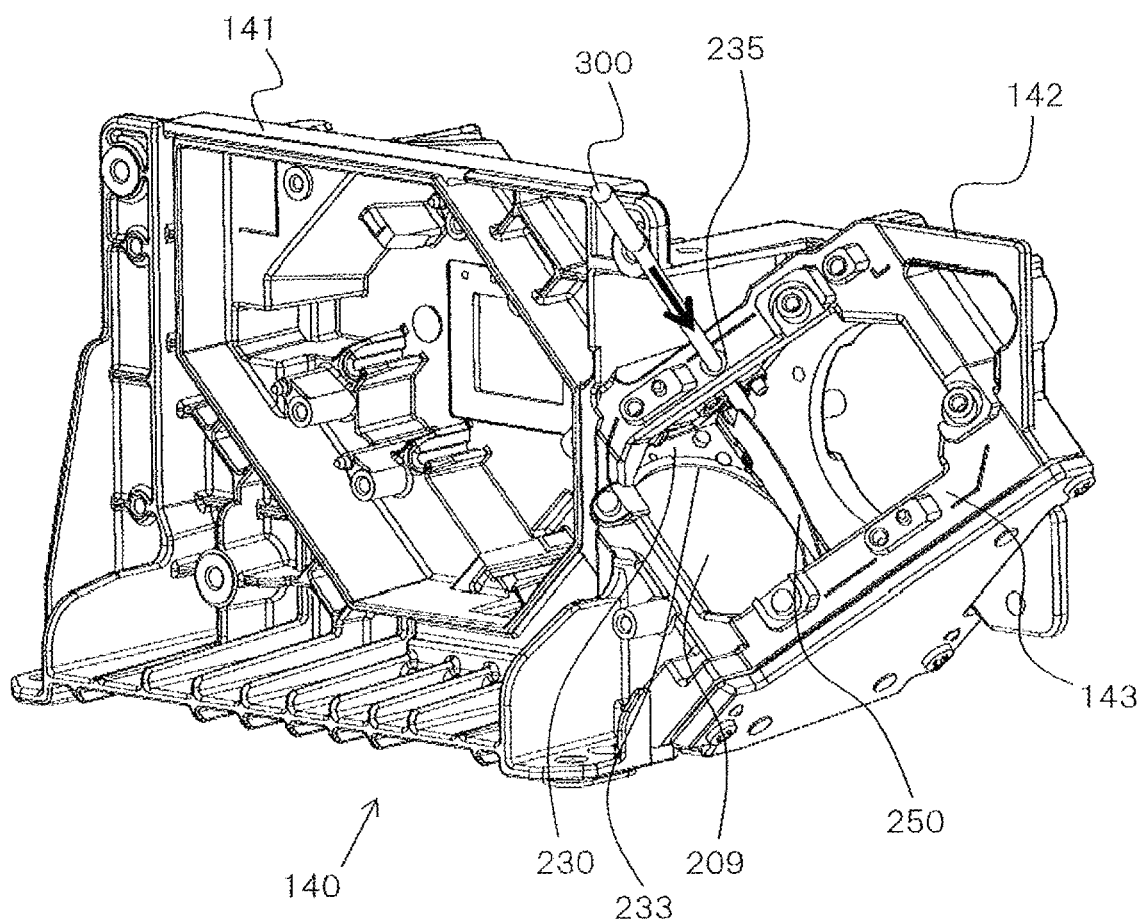
FIG. 8 is a perspective view illustrating the internal structure of the optical component housing section in the state where the light-beam angle adjustment mirror is removed and also in the state where the light-shielding plate is held at a position to expose the relay lens (second position).
Figure 9A:
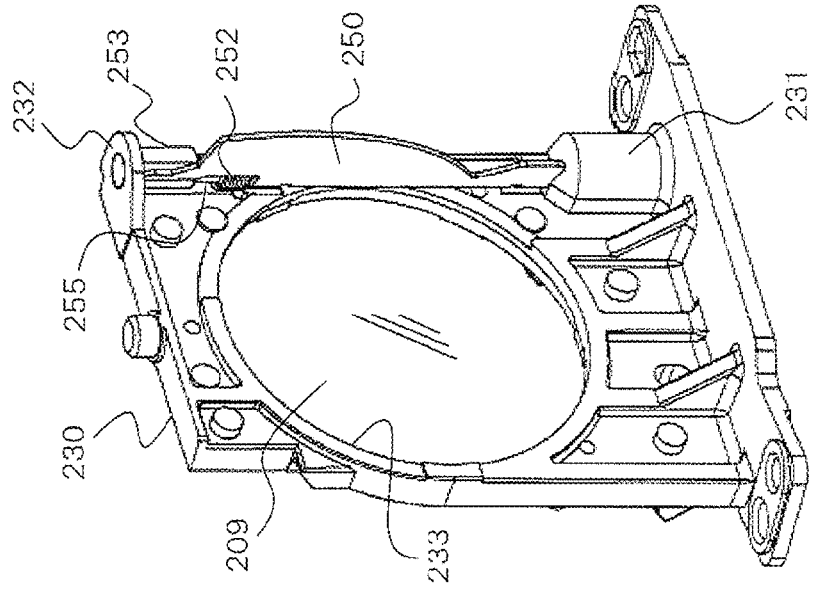
Figure 9B:
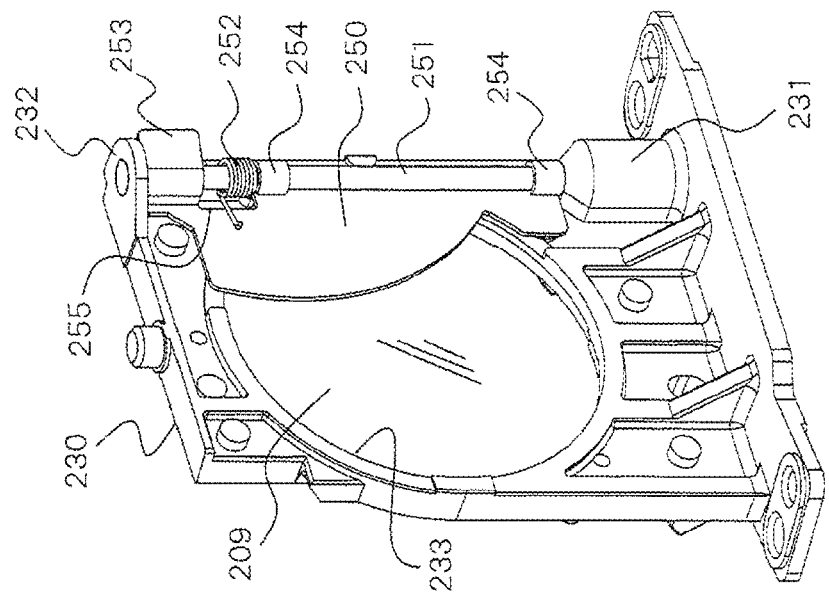
FIG. 9B is the view illustrating the state where the light-shielding plate exposes the relay lens.

FIG. 7 is a perspective view illustrating the internal structure of the optical component housing section 140 in the state where the light-beam angle adjustment mirror 170 is removed and also in the state where the light-shielding plate 250 is held at a position to shield a portion of the relay lens 209 (first position). FIG. 8 is a perspective view illustrating the internal structure of the optical component housing section 140 in the state where the light-beam angle adjustment mirror 170 is removed and also in the state where the light-shielding plate 250 is held at a position to expose the relay lens 209 (second position). FIG. 9A,B are perspective views of a lens holder member 230 holding the relay lens 209. FIG. 9A is the view illustrating the state where the light-shielding plate 250 shields a portion of the relay lens 209, and FIG. 9B is the view illustrating the state where the light-shielding plate 250 exposes the relay lens 209.

As shown in FIGS. 7 to 9A,B, the lens holder member 230, which is mounted with the light-shielding plate 250 and a movable mechanism for the light-shielding plate 250 described later, is accommodated in the inside (a lower portion) of the second housing section 142. The lens holder member 230 has a large opening 233 formed therein so that the relay lens 209 is fitted in the opening 233. And, the light-shielding plate 250 is rotatably attached to the lens holder member 230 in such a manner as to cover a portion of the relay lens 209.

It is noted that reference sign 235 denotes an insertion opening for insertion of a jig 300 which will be described later. The insertion opening 235 is provided in a position of the mount 143 formed in the second housing section 142, the position facing toward an abutting piece 253 of the light-shielding plate 250 which will be described later.

The light-shielding plate 250 is made of, for example, metal materials having heat resistance, such as stainless, aluminum or the like, and is formed in a shape suitable for shielding the unwanted light. For example, in the embodiment, the light-shielding plate 250 is formed in an approximately quarter elliptical shape, but may be formed in any shape. In a side edge in the longitudinal direction of the light-shielding plate 250, two insertion holes 254 are drilled and spaced from each other along the longitudinal direction (the vertical direction of FIG. 9A,B). A shaft member 251 of a round bar shape is inserted through the two insertion holes 254.

The light-shielding plate 250 is equipped at one end with a cutout 255 and the abutting piece 253 which includes a member bent to cover the order of approximately one half of the shaft member 251 along the circumferential direction of the shaft member 251. The cutout 255 is provided for preventing interference with a torsion spring 252 which is installed on the shaft member 251. The abutting piece 253 is a site acted upon by a pressure through the jig 300 when the light-shielding plate 250 is rotated.

Meanwhile, the lens holder member 230 is equipped with a bearing 232 rotatably supporting one end of the shaft member 251, and a bearing 231 rotatably supporting the other end of the shaft member 251. Thus, in the conditions where the shaft member 251 is inserted through the two insertion holes 254 of the light-shielding plate 250 and also both ends of the shaft member 251 are supported respectively by the bearing 231 and the bearing 232, the light-shielding plate 250 turns around the shaft member 251.

Here, the torsion spring 252 which is an example of biasing members is installed near the bearing 232 of the shaft member 251. By the torsion spring 252, the light-shielding plate 250 is biased normally to the shielding position (first position) where a portion of the relay lens 209 is shield to block the unwanted light. And, when a force against the biasing force of the torsion spring 252 acts on the light-shielding plate 250, the light-shielding plate 250 can be rotated from the shielding position to an exposing position (second position) where the relay lens 209 is exposed to allow the unwanted light to illuminate the display element 102.

In the embodiment, the shaft member 251, insertion holes 254, bearings 231, 232, torsion spring 252 and abutting piece 253 form a "light-shielding plate movable mechanism" of the present invention.

The round-bar shaped jig 300 is used to rotate the light-shielding plate 250. As illustrated in FIG. 7, the jig 300 is inserted from the insertion opening 235 so that the leading end of the jig 300 is pressed against the abutting piece 253. As illustrated in FIG. 8, as the jig 300 is further pressed along the insertion direction (the arrow direction of FIG. 8), the abutting piece 253 is rotated around the shaft member 251 against the biasing force of the torsion spring 252. As a result, the light-shielding plate 250 is rotated integrally with the abutting piece 253 around the shaft member 251.

Here, a feature in the embodiment is that, when the leading end of the jig 300 is inserted to a predetermined inserted position beyond the leading end of the abutting piece 253, the light-shielding plate 250 is configured to be automatically held in the exposing position by the insertion of the jig 300 (hereinafter referred to as "self-lock"). The self-locking mechanism will be described below with reference to the figures.

FIG. 10A,B are diagrams illustrating the inserted position of the jig 300 and the rotation position of the light-shielding plate 250. FIG. 10A illustrates the state where the jig 300 slightly presses the abutting piece 253. FIG. 10B illustrates the state where, after rotating the abutting piece 253, the jig 300 is inserted beyond the position of the abutting piece 253 located before the insertion of the jig 300. As illustrated in FIG. 10A, in the state where the jig 300 slightly presses the abutting piece 253 of the light-shielding plate 250, the jig 300 is acted upon by the basing force of the torsion spring 252 in the arrow direction of FIG. 10A. Because of this, if the operator removes his/her hand from the jig 300 in the state in FIG. 10A, the jig 300 is pushed back in the direction of the arrow Q in the figure by the biasing force of the torsion spring 252.

Meanwhile, in the state in FIG. 10B, after the leading end of the jig 300 presses the abutting piece 253 to rotate the abutting piece 253 around the shaft member 251 in the direction R in the figure, the leading end of the jig 300 crosses the position of the abutting piece 253 located before the insertion of the jig 300, and then is inserted to reach the predetermined position in the direction P in the figure. Because of this, the biasing force of the torsion spring 252 is overcome, so that the light-shielding plate 250 is held in the exposing position. Thus, even after the operator removes his/her hand from the jig 300, the light-shielding plate 250 remains held in the exposing position, so that the illumination light to be incident to the relay lens 209 is not blocked. That is, the unwanted light is permitted to illuminate the display element 102.

Angle Adjustment Procedure of Light-Beam Angle Adjustment Mirror 170

For example, if the need arises to make an angle adjustment to the light-beam angle adjustment mirror 170 during repairs or pre-shipment inspection of the projection-type video display apparatus 100, the operator first removes a cover 150 of the optical component housing section 140. Then, as illustrated in FIG. 4 and FIG. 5, the insertion opening 235 is exposed. The operator inserts the jig 300 into the insertion opening 235 and presses the jig 300 against the abutting piece 253.

In step with the operation of pressing the abutting piece 253 with the leading end of the jig 300 to oppose the biasing force of the torsion spring 252, the abutting piece 253 rotates integrally with the light-shielding plate 250 around the shaft member 251. The jig 300 is further pressed until the leading end of the jig 300 crosses the position of the abutting piece 253 located before the insertion of the jig 300 and then reaches the predetermined position in the direction P of FIG. 10B, whereupon the rotating motion of the abutting piece 253 is locked by the jig 300 as shown in FIG. 10B. The light-shielding plate 250 is rotated from the shielding position to shield a portion of the relay lens 209 (see FIG. 7) to the exposing position to expose the relay lens 209 (see FIG. 8), and then the light-shielding plate 250 is held in the exposing position (self-lock).

In this state, even if the operator removes his/her hand from the jig 300, the light-shielding plate 250 remains held in the exposing position. Therefore, based on the relative position of the effective display region abcd and the projection light region ABCD in which the unwanted light projected toward the screen is not blocked (see FIG. 13A), the operator can tighten and/or loosen the adjustment screws 146a, 146b in order to adjust the angle of the light-beam angle adjustment mirror 170 with ease and with a high degree of precision.

Further, because the state where the unwanted light is not blocked by the light-shielding plate 250 can be achieved by the operator simply pressing the jig 300 until the predetermined inserted position, the work of adjusting the angle of the light-beam angle adjustment mirror 170 is facilitated. Then, after the angle adjustment to the light-beam angle adjustment mirror 170 is completed, pulling out the jig 300 allows the biasing force of the torsion spring 252 to hold the light-shielding plate 250 in the shielding position to shield a portion of the relay lens 209. Therefore, under usual service conditions, since the unwanted light is blocked by the light-shielding plate 250, there is no reduction in quality of projected images. It is noted that the torsion spring 252 may be replaced by a magnet or the like, provided that it can bias the light-shielding plate 250 and the abutting piece 253. The configuration using a combination of the torsion spring 252 and a magnet is also possible.

Reference to Other Embodiments

The purpose of making the light-shielding plate 250 capable of moving is to prevent the outer peripheral portion of the projected projection light region from being narrowed by blocking the unwanted light when the angle adjustment is made to the light-beam angle adjustment mirror 170 (see FIG. 13A,B). Conversely speaking, unless the outer peripheral portion of the injection light region is narrowed, even if a shadow is made within the projection light region, this presents no problem in performing the work of adjusting the light-beam angle adjustment mirror 170 to an optimum angle.

Figure 11A:
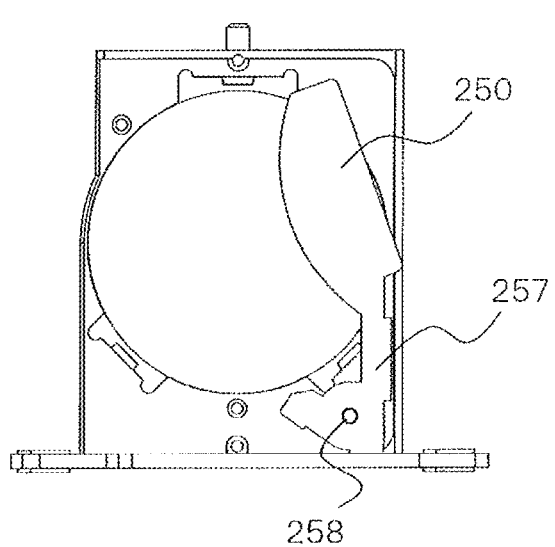
Figure 11B:
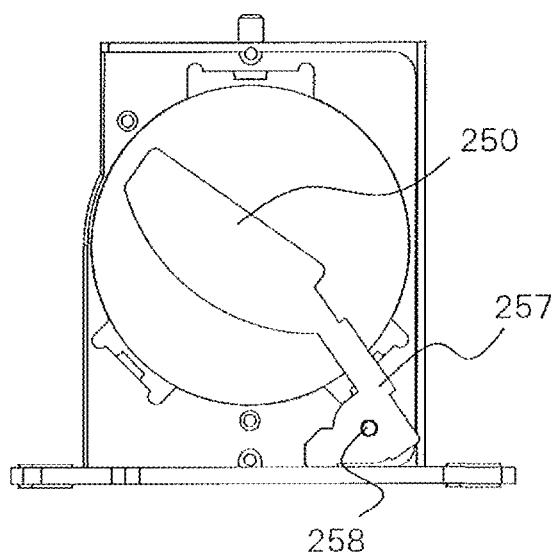
FIG. 11B illustrates the state where the light-shielding plate is in a position to shield a central portion of the relay lens (second position).
Figure 12A:
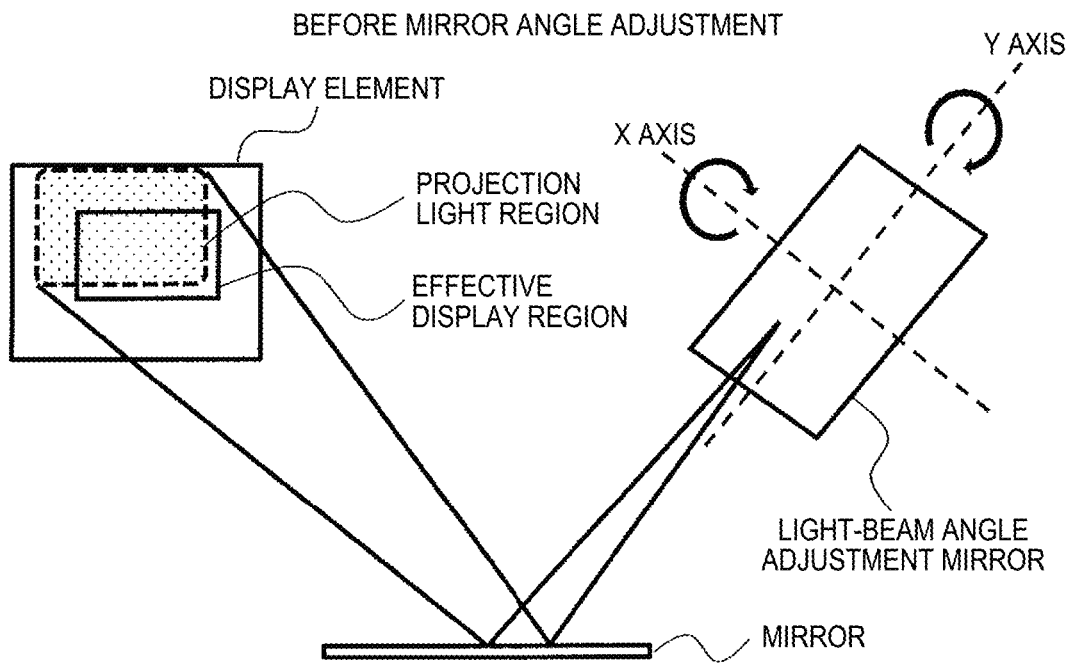
FIG. 12A, B are diagrams for explaining a change in a relative position of the effective display region and the projection light region before the angle adjustment to the light-beam angle adjustment mirror (FIG. 12A) and after the angle adjustment to the light-beam angle adjustment mirror (FIG. 12B).
Figure 12B:
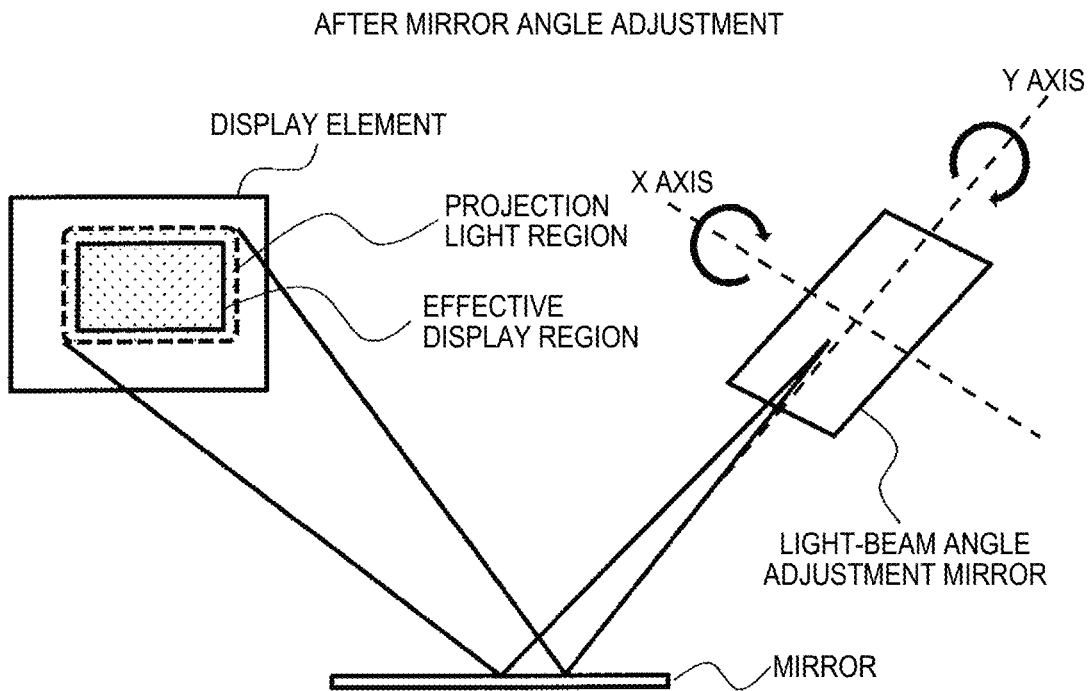

In light of this, wide variations of the movable mechanism for the light-shielding plate 250 may be conceivable. FIG. 11A,B are diagrams illustrating a modification of the movable mechanism of the light-shielding plate 250. FIG. 11A illustrates the state where the light-shielding plate 250 is in a position to shield a portion of the relay lens 209 to block the unwanted light (first position), and FIG. 11B illustrates the state where the light-shielding plate 250 is in a position to shield a central portion of the relay lens 209 (second position).

As illustrated in FIG. 11A,B, the light-shielding plate 250 is coupled to an arm 257, thus rotating as a shaft member around a pin 258. As illustrated in FIG. 11A, by a spring serving as a biasing member not shown, the light-shielding plate 250 is biased to the shielding position where the light-shielding plate 250 shields a portion of the relay lens 209 to block the unwanted light (first position). Then, when a jig, not shown, causes action opposite to the biasing force of the spring to work on the light-shielding plate 250, the light-shielding plate 250 is retracted from the shielding position to a central portion (different position) of the relay lens 209 as illustrated in FIG. 11B, and then is capable of rotating to a retracted position (second position) to shield the central portion for permission for the unwanted light to illuminate the display element 102.

With this configuration, in the process of the angle adjustment to the light-beam angle adjustment mirror 170, although a shadow is made at the center of the projection light region by the light-shielding plate 250, the outer peripheral portion of the projection light region is never hidden by the light-shielding plate 250. This enables locating an optimum position of the relative position of the projection light region and the effective display region. Accordingly, similarly to the above-described embodiment, the angle adjustment to the light-beam angle adjustment mirror 170 can be performed with ease and with a high degree of precision.

Further, other than the configuration of the light-shielding plate 250 rotating around the shaft member 251 or the pin 258, the light-shielding plate 250 may be configured, for example, to slide along the in-plane direction of the relay lens 209.

Also, in the above-described embodiment, the light-shielding plate 250 is placed on the incoming side of the relay lens 209, but the light-shielding plate 250 may be placed on the outgoing side of the relay lens 209. Even in this case, if a need arises, in general use mode of the projection-type video display apparatus, to block the unwanted light to ensure high-quality images and also to perform the angle adjustment to the light-beam angle adjustment mirror 170, the angle adjustment can be performed with ease and with a high degree of precision It should be understood that the present invention is not limited to the above embodiments and contains various modifications. For example, the above embodiments have been described in detail for the purpose of explaining the present invention clearly, and the present invention is not necessarily limited to including all the configurations described above.

REFERENCE SIGNS LIST

100 . . . Projection-type video display apparatus
101 . . . Projection optical system
102 . . . Display element
104 . . . Illumination optical system
106R, 106G, 106B . . . Light source
« . . . Optical component housing section
141 . . . First housing section
142 . . . Second housing section (Housing section)
143 . . . Mount (Mirror angle adjustment mechanism)
144 . . . Mirror holding member (Mirror angle adjustment mechanism)
145 . . . Spring (Mirror angle adjustment mechanism)
146a, 146b . . . Adjustment screw (Mirror angle adjustment mechanism)
147 . . . Supporting point (Mirror angle adjustment mechanism)
170 . . . Light-beam angle adjustment mirror (Mirror)
209 . . . Relay lens (Lens)
230 . . . Lens holding member
231, 232 . . . Bearing 232 . . . Bearing
235 . . . Insertion Opening
250 . . . Light-shielding plate
251 . . . Shaft member
252 . . . Torsion Spring (Biasing member)
253 . . . Abutting piece
254 . . . Insertion hole
255 . . . Cutout
257 . . . Arm
258 . . . Pin
300 . . . Jig

The invention claimed is:

1. A projection-type video display apparatus, comprising:
light sources;
an illumination optical system that collects light emitted from the light sources to produce illumination light;
a display element that produces video to be projected; and
a projection optical system where the illumination light produced in the illumination optical system enters to project the video produced on the display element,
wherein the illumination optical system includes:
a mirror that reflects the illumination light toward the display element;
a lens that is placed between the mirror and the display element on an optical path of the illumination light;
a mirror angle adjustment mechanism that adjusts an angle of the mirror;
a light-shielding plate that blocks unwanted light which is a portion of the illumination light reflected off the mirror toward the display element via the lens; and
a light-shielding plate moving mechanism that is able to move the light-shielding plate between a first position to block the unwanted light and a second position to permit the unwanted light to illuminate the display element,
wherein the light-shielding plate moving mechanism has:
a shaft member;
at least one insertion hole that is formed in the light-shielding plate for insertion of the shaft member;
a plurality of bearings that rotatably support both ends of the shaft member;
a biasing member that uses a biasing force to hold the light-shielding plate in the first position; and
an abutting piece that is formed on the light-shielding plate, and is subjected to a pressing force in a direction opposite to the biasing force of the biasing member by a jig to rotate the light-shielding plate around the shaft member from the first position to the second position.

2. The projection-type video display apparatus according to claim 1, wherein the light-shielding plate is capable of moving between a position where, as the first position, the light-shielding plate shields a portion of the lens and a position where, as the second position, the light-shielding plate exposes the lens.

3. The projection-type video display apparatus according to claim 1, wherein the light-shielding plate is capable of moving between a position where, the first position where the light-shielding plate shields a portion of the lens and the second position where the light-shielding plate shields a different portion of the lens from the first position.

4. The projection-type video display apparatus according to claim 1, wherein the light-shielding plate is placed to shield a portion of either an incoming side surface or an outgoing side surface of the lens.

5. The projection-type video display apparatus according to claim 1, further comprising a housing section that houses the light-shielding plate moving mechanism,
wherein the abutting piece is formed by being bent to cover the shaft member,
the housing section has an insertion opening formed in a position facing toward the abutting piece when the light-shielding plate moving mechanism is housed in the housing section, the insertion opening being provided for insertion of the jig, and
after the jig is inserted from the insertion opening, while the jig being pressing the abutting piece along an insertion direction of the jig, the jig is inserted to a predetermined insertion position beyond a position of the abutting piece located before the jig is inserted, and the light-shielding plate is held in the second position.

* * * * *